United States Patent [19]

Schumacher

[11] Patent Number: 5,556,332
[45] Date of Patent: Sep. 17, 1996

[54] AIR DUCT FOR A POSITION ADJUSTABLE SERVICE PANEL

[75] Inventor: Markus Schumacher, Bremen, Germany

[73] Assignee: Daimler-Benz Aerospace Airbus GmbH, Hamburg, Germany

[21] Appl. No.: 184,984

[22] Filed: Jan. 24, 1994

[30] Foreign Application Priority Data

Jan. 22, 1993 [DE] Germany .................... 43 01 681.2

[51] Int. Cl.⁶ .................................................. B64D 13/00
[52] U.S. Cl. ................................................. 454/76; 454/64
[58] Field of Search ................................. 454/64, 76, 68, 454/166, 254, 338

[56] References Cited

U.S. PATENT DOCUMENTS 3,913,470  10/1975  Cullen ............................ 454/64
4,592,270  6/1986  Vener ............................. 454/68

FOREIGN PATENT DOCUMENTS 574583  9/1977  U.S.S.R. ......................... 454/64
1330874  9/1973  United Kingdom ............ 454/76

Primary Examiner—Harold Joyce
Attorney, Agent, or Firm—W. G. Fasse; W. F. Fasse

[57] ABSTRACT

Service panels such as passenger service panels in an aircraft or other passenger conveyance are equipped with fresh air outlets. The air outlets are connected to an air supply duct in such a way that the service panels can be adjusted in their position lengthwise relative to the longitudinal aircraft cabin axis. This purpose is accomplished by making the tap connection between the service panel and a fresh air supply duct adjustable in the axial direction along the air duct while maintaining the proper seal between a tap member and the air duct. The seal is maintained by providing the duct with a slot covered by at least one sealing lip and by providing the tap member with a sealing guide slide that adjustably seals the tap member in the duct.

19 Claims, 8 Drawing Sheets

AIR DUCT FOR A POSITION ADJUSTABLE SERVICE PANEL

FIELD OF THE INVENTION

The invention relates to an air duct that is connectable to a plurality of position adjustable service panels including air outlets for example, in passenger service panels in an aircraft cabin or passenger train compartments, whereby these service panels are changeable or adjustable in their position, for example for the purpose of repositioning the seats in the aircraft cabin.

BACKGROUND INFORMATION

Passenger service panels are provided in the ceiling of an aircraft cabin above the respective passenger seat. These service panels comprise several components that can be controlled by the passenger, for example nozzle adjustments for the supply of fresh air, a reading light that the passenger can switch on or off, a display for calling a flight attendant, a loudspeaker, an oxygen mask, optical indicating devices, and possibly switches operable by the passenger for activating or deactivating any of the just listed components, especially where these components are electrically operable.

The just described position adjustable service panels may be provided individually for each seat or one such panel may comprise a sufficient number of components for a plurality of seats arranged in a row. In the latter case, for example, several oxygen masks, fresh air outlets, etc. may be provided in the respective service panel. A problem is encountered when the seating arrangement in an aircraft passenger cabin must be modified, for example, by increasing or decreasing the spacing between the seats in the longitudinal aircraft direction. The problem is caused by the fact that the service panels must also be repositioned whereby the connection of the service panels to a rigid air supply duct is difficult because conventional fixed position taps no longer fit the new position of the service panels relative to the rearranged seats. Heretofore, simply new air ducts have been installed when an aircraft had to be retooled in its seating arrangement. The new set of air ducts would make sure that the taps match the new seat positions. These conventional retooling operations are rather material intensive, labor intensive, and hence expensive.

OBJECTS OF THE INVENTION

In view of the foregoing it is the aim of the invention to achieve the following objects singly or in combination:

to construct an air duct for the above purposes so that position adjustable taps may be provided anywhere along the length of the duct, whereby a service panel of the type described above may be connected to the air duct anywhere along the length of the duct or at least along a length that permits the above mentioned rearrangement of the seats or rows of seats in an aircraft;

to permit the connection of the service panels to a permanently installed air duct in any desired position with little effort and expense;

to make sure that a repositioned air tap is properly sealed to the air duct in any of a number of possible adjustable positions;

to construct the air duct and the taps in such a manner that the taps may be preassembled with the duct and then the taps are adjustable along the length of the duct at the time of installation, whereby the same air duct with its adjustable taps can be used for different aircraft types; and to use flexible tap extensions that permit a repositioning of the respective service panel.

SUMMARY OF THE INVENTION

The above objects have been achieved according to a first embodiment of the invention in an air duct that is provided with a longitudinal slot flanked by at least one sealing lip that extends along the slot and closes the slot in the rest position with a slot sealing elastic bias. Each tap for withdrawing air from the duct includes a slide that is movably received in the air duct and has a tap member movably passing through the slot for lengthwise movement along the air duct. The slide carries the tap member that reaches into the hollow profile of the air duct. The slide comprises an outer guide element and an inner guide element rigidly secured to the tap member in a sealed manner. The inner and outer guide elements are so spaced from each other thereby forming a gap in which the sealing lip or lips are received in a sealing manner. The guide elements and the sealing lip are sufficiently elastic to provide the seal anywhere along the slot in the duct while still assuring the proper guiding of the slide along the duct.

The slideable, yet sealed connection between the air duct and the slide with its tap member has the special advantage that an air duct according to the invention once installed does not have to be replaced by a new duct with different stationary taps when the seating arrangement is changed in an aircraft cabin. As a result, substantial material savings as well as savings in labor costs are achieved.

In the second embodiment a fixed or adjustable tap is connected to the respective service panel by a flexible extension that is either an integral or separate flexible part of the tap. The separate flexible part may be a flexible hose secured to the tap by a hose clamp.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1A:
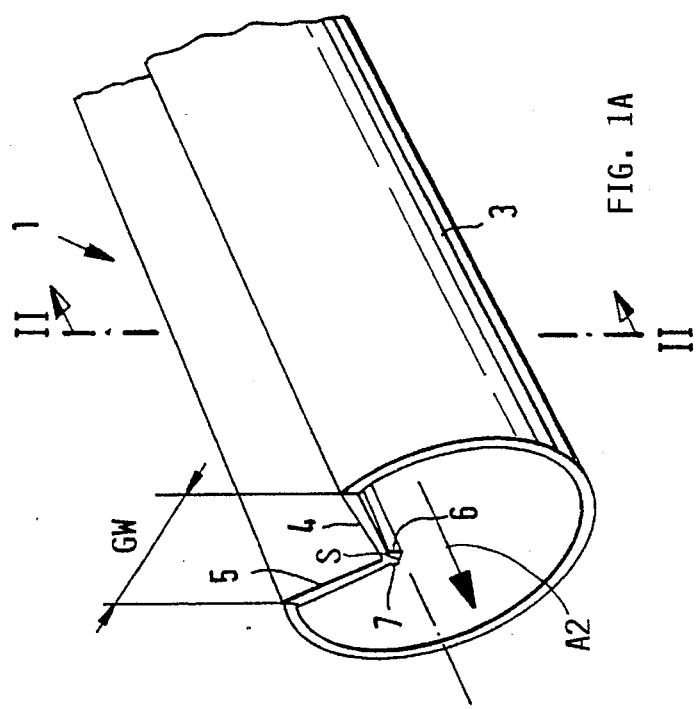
FIG. 1A is a perspective view of an air duct portion according to the invention with two flexible sealing lips closing a longitudinal gap and cooperating with the guide slide of FIG. 1.

FIG. 1A shows an air duct 1 made, for example, as a plastic material forming a substantially rigid pipe 3 provided with two sealing lips 4 and 5 reaching inwardly into the pipe 3 to form a gap having a gap width GW. The inward edge 6 of the sealing lip 4 and the inward edge 7 of the sealing lip 5 contact each other with an elastic bias so as to form a seal S along the entire gap. The sealing lips 4 and 5 are elastic but still sufficiently stiff to bias the two edges 6 and 7 against each other. In the shown closed position of the sealing lips 4 and 5, the excess pressure of the air inside the duct 1 even increases the sealing action along the seal S since the two lips 4 and 5 form a V-shape that reaches into the pressurized air in the duct 1, whereby the pressurized air provides a sealing force in addition to the biasing force provided by the material and shape of the sealing lips 4 and 5.

Figure 1:
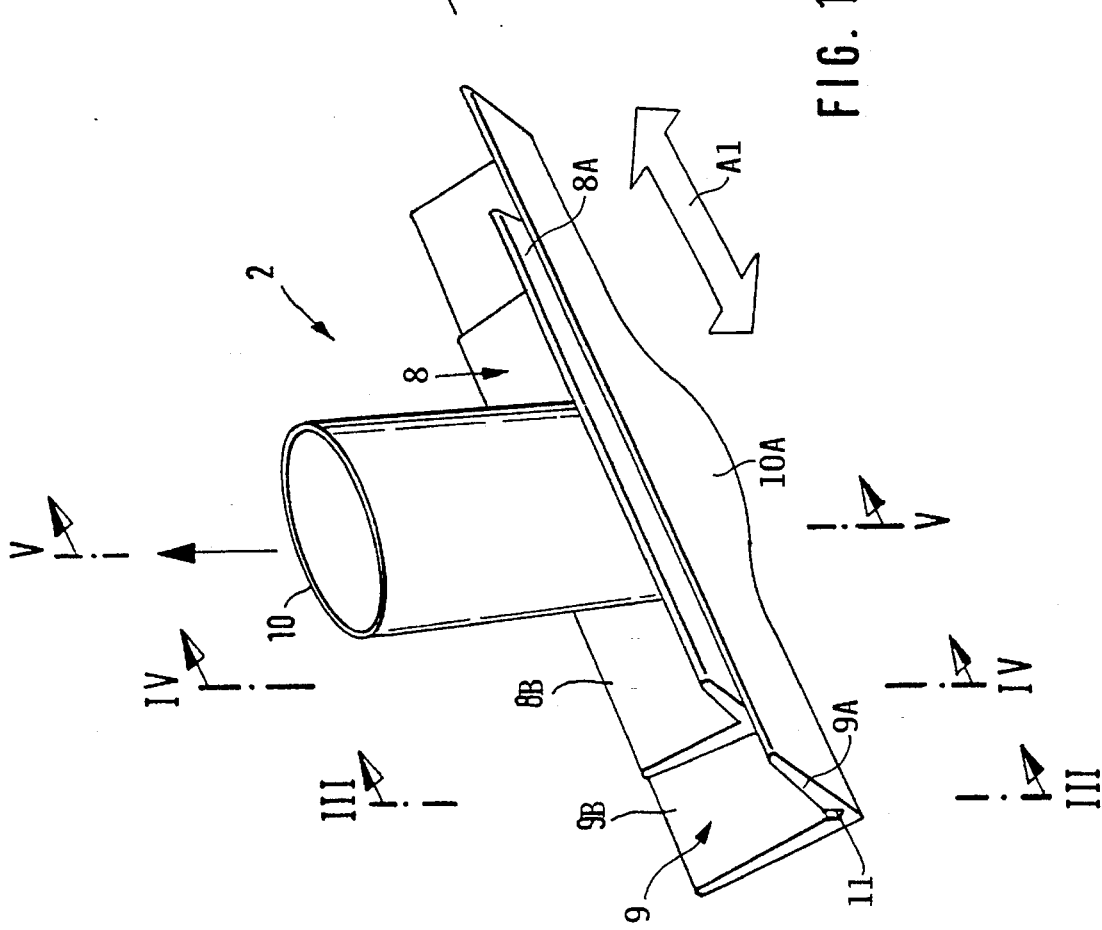
FIG. 1 shows a perspective view of a guide slide with a tap member according to the invention for cooperation with an air duct of the invention shown in FIG. 1A.

FIG. 1 shows a guide slide 2 with its guide elements 8 and 9 connected in a sealed manner to a tap member 10, whereby the elastic guide elements 8 and 9 form a bulge 10A around the tap member 10. The slide 2 is movable into the gap formed by the sealing lips 4 and 5. The slide 2 is movable back and forth along the sealing lips 4, 5 as indicated by the arrow A1, into any sealed position along the gap. For the initial assembly, the pipe 3 may be pushed onto the slide 2 as indicated by the arrow A2. However, endwise axial insertion is not necessary. Due to the V-shape of the lips 4, 5 and due to the correspondingly V-shaped configuration of the guide elements 8, 9 the slide 2 may be inserted radially into the pipe 3 anywhere along the pipe.

The two guide elements 8 and 9 form an outer guide element 8 and an inner guide element 9. The outer guide element may be somewhat shorter than the inner guide element 9 as seen in FIG. 1. The inner guide element 9 has two wings 9A and 9B that form an angular sectional profile with a guide groove 11 in which the two edges 6 and 7 of the lips 4 and 5 are received when the slide 2 is moved either radially or axially into the gap of the pipe 3. Similarly, the outer guide element 8 has two wings 8A and 8B also forming an angular sectional profile. The wings 8A, 8B and 9A, 9B encircle the tap member 10 in a sealed manner and form the above mentioned bulge 10A. Additionally, the wing 8A is spaced from the wing 9A sufficiently to receive the sealing lip 4 between these guide wings 8A and 9A. Similarly, the wings 8B and 9B are spaced from each other to receive the sealing lip 5 when the slide 2 is pushed into the gap of the tube 3 either axially or radially. Air can be withdrawn from the pipe 3 through the tap member 10.

Figure 2:
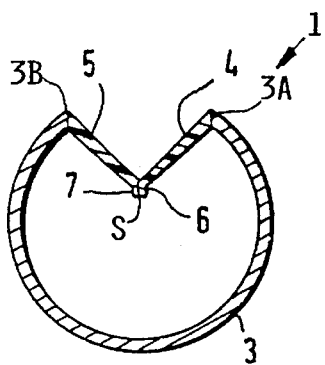
FIG. 2 is a sectional view along section line II—II in FIG. 1A showing the present duct with two sealing lips.

FIG. 2 shows in its sectional view the pipe 3 of the duct 1 with the sealing lips 4 and 5 reaching inwardly into the pipe 3 so that the edges 6 and 7 form the seal S. The cross-sectional thickness of the sealing lips 4 and 5 is largest where these lips merge into the body of the pipe 3 and smallest next to the edges 6 and 7 so that the lips 4 and 5 taper inwardly. The lips 4 and 5 are so dimensioned and directed that the seal S is formed in a central vertical plane of symmetry passing in FIG. 2 through the central longitudinal axis of the pipe 3. While the sealing lips 4 and 5 are made of a flexible elastomeric material, the pipe 3 is made of a relatively stiff material that is rigid against bending and the wall thickness of the pipe 3 is so dimensioned that the internal pressure of the air in the pipe does not noticeably deform the pipe 3. The sealing lips 4 and 5 are, for example, adhesively bonded to the pipe 3 along the edges 3A and 3B.

Figure 3:
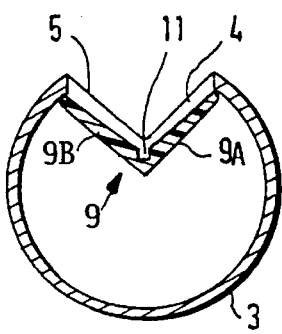
FIG. 3 is a sectional view along section line III—III in FIG. 1, wherein the section passes through a longer slide guide element having two guide wings and the air duct is also shown in section to show the position of the elements relative to each other.

FIG. 3 shows the inner guide element 9 partially inserted into the pipe 3. The sealing lips 4 and 5 rest against the upwardly facing surface of the guide wings 9A and 9B respectively while the edges 6 and 7 begin to engage the groove 11. For this purpose, the surface shape of the inner guide element 9 with its groove 11 conforms to that of the sealing lips 4 and 5 including the edges 6, 7 to form the seal.

Figure 4:
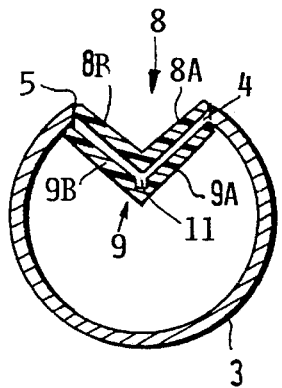
FIG. 4 is a sectional view along section line IV—IV in FIG. 1 illustrating two slide guide elements each having two wings shown in their position relative to the duct section.
Figure 5:
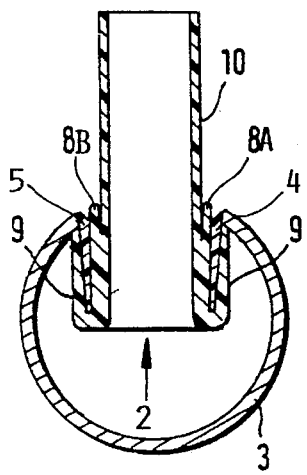
FIG. 5 is a sectional view along section line V—V in FIG. 1 illustrating the slide positioned in the air duct with the tap member sealed in the duct.

In FIG. 4 the insertion of the slide 2 into the pipe 3 has progressed so that the upper, shorter guide element 8 also engages with its wings 8A and 8B the sealing lips 4 and 5 respectively. More specifically, the downwardly facing surface of the wing 8A engages the lip 4 while the downwardly facing surface of the wing 8B engages the lip 5. Thus, the above mentioned gap or spacing between the wings 8A and 9A and the gap or spacing between the wings 8B and 9B receive the sealing lips 4 and 5 in a sealed yet slideable manner. For this purpose the surfaces sliding relative to each other should be smooth. FIG. 5 shows a section through the slide 2 with its sealing elements 8 and 9 as well as with its tap member 10 and through the pipe 3. The sealing lips 4 and 5 are held in a sealing manner between the wings of the guide elements 8 and 9, thereby providing a seal all around the tap member 10. Additionally, the seal is maintained along the groove 11 in front of and behind the tap member 10. The shape of the slide with its wings 8A, 8B, 9A, 9B is such that in combination with the elasticity of the sealing lips 4 and 9 a complete seal is maintained in any position of the slide 2 along the pipe 3. The tap member 10 will be connected to air outlet valves in the service panels above passenger seats as will be described in more detail below.

The pressurized air in the duct 1 or pipe 3 can be taken out only through the taps 10 since the sealing lips 4 and 5 are open only where the tap 10 passes through the gap between the sealing lips 4 and 5 which maintain the seal around the outside of the tap 10. Due to the slideability of the tap 10 with its slide 2 all along the pipe 3, it is possible to connect the tap 10 to a respective service panel anywhere along the pipe 3. The sliding movement of the slide 2 with its tap 10 along the sealing lips 4 and 5 is facilitated if the contact pressure between sealing lips 4, 5 and the respective guide wings 8A, 9A; 8B, 9B is very slight or nonexistent. Surprisingly, a proper seal is assured around the tap 10 and along the gap between the lips and the wings even with such a very slight contact between the lips and the wings.

Figure 6:
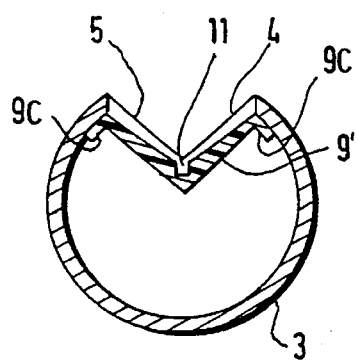
FIG. 6 is a sectional view similar to that of FIG. 3, but illustrating a modified slide guide element in which each lower guide element wing has its own guide rim.

FIG. 6 is a view similar to that of FIG. 3, however showing an inner guide element 9' in which each wing of the guide element has a radially outer guide rim 9C that bears against the inner wall of the pipe 3.

Figure 7:
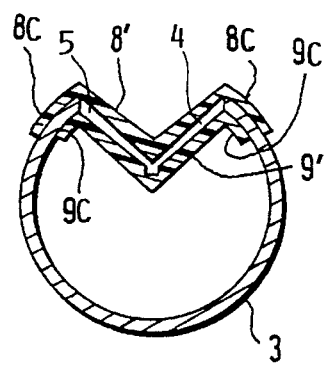
FIG. 7 is a sectional view similar to that of FIG. 4, but showing two slide guide elements with guide rims along the outer edges of each guide element wing.

FIG. 7 is a view similar to that of FIG. 4, but illustrating in addition to the inner guide element 9' with its radially outer rims 9C, an outer guide element 8' also provided with radially outer, circumferentially extending guide rims 8C in contact with the outer surface of the pipe 3.

Figure 8:
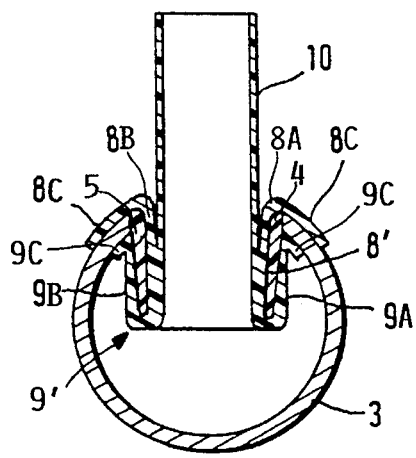
FIG. 8 is a sectional view similar to that of FIG. 5, however showing the cooperation of a slide having wings with guide rims according to FIG. 7 with an air duct according to the invention.

FIG. 8 is a view similar to that of FIG. 5, showing the position of the individual wings 8A, 8B and 9A, 9B as well as the guide rims 8C and 9C in the section through the tap member 10. The sealing lips 4 and 5 are held between the respective wings of the guide elements and the rims 8C and 9C rest against the respective surfaces of the pipe 3, whereby an improved seal is maintained around the tap member 10 and the strength of the whole structure is improved. The dimensions of the just described elements relative to each other are so selected that the axial movement of the slide along the pipe 3 is possible. The angled guide rims 8C and 9C facilitate the guiding and sliding of the slide relative to the pipe 3, whereby even wear and tear is reduced. As mentioned, the mechanical strength of the slide with the guide rims 8C and 9C is increased relative to guide elements without such rims 8C and 9C.

Figure 9:
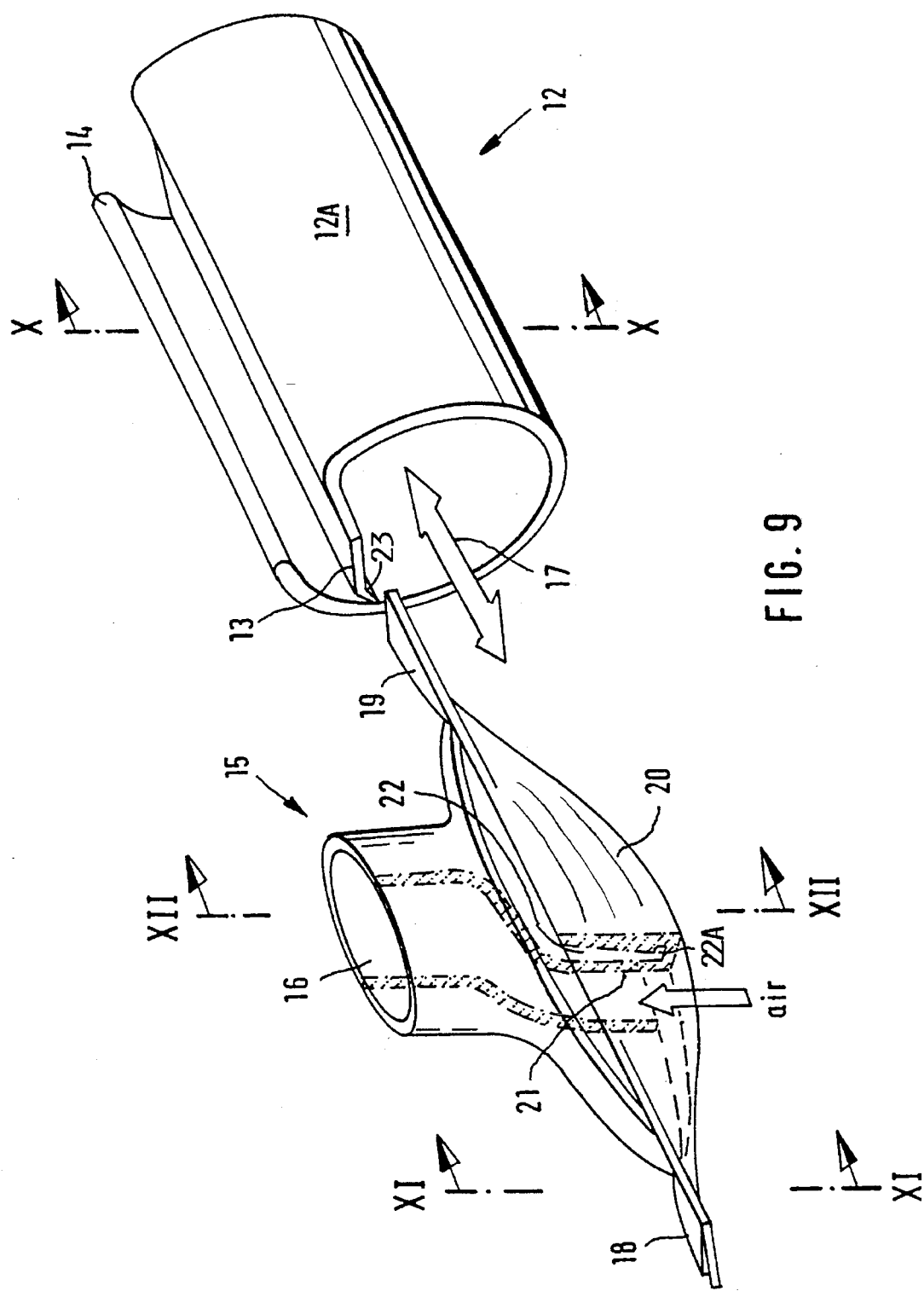
FIG. 9 is a perspective view similar to that of FIGS. 1 and 1A, but showing a modified embodiment according to the invention with an air duct having one sealing lip and a guide edge to form a longitudinal gap for cooperation with a modified guide slide.

FIG. 9 shows a modified embodiment of the present invention in which an air duct 12 comprises a pipe 12A with only one sealing lip 13 and a guide edge 14 which functions as an auxiliary sealing lip. The pipe 12A has also a substantially rigid cross-sectional configuration as does pipe 3, whereby the pipe 12A will not flexibly yield, except for its sealing lip 13 which is made of an elastomeric material. The guide edge 14 and the elastically yielding sealing lip 13 extend in parallel to each other. A modified slide 15 carries a tap or tap member 16 and guide elements 18 and 19. The guide elements 18 and 19 merge into each other to form an inner guide surface 20 on one side of the tap 16 while the other side of the tap 16 itself is provided with a guide surface 16A that engages the inner surface of the pipe 12A when the slide 15 is moved into the pipe 12A as indicated by the double arrow 17 which indicates that the slide 15 is axially movable in either direction in the slot of the pipe 12A as will be described in more detail below. The inner end of the tap 16 is shaped to form an outer guide surface 21 that engages the outer surface of the sealing lip 13 in a guide slot 22 formed between the two guide surfaces portions 20 and 21 of the slide 15. The guide slot 22 has a groove 22A at its inner end in which the free edge or rim 23 of the sealing lip 13 is received.

Figure 10:
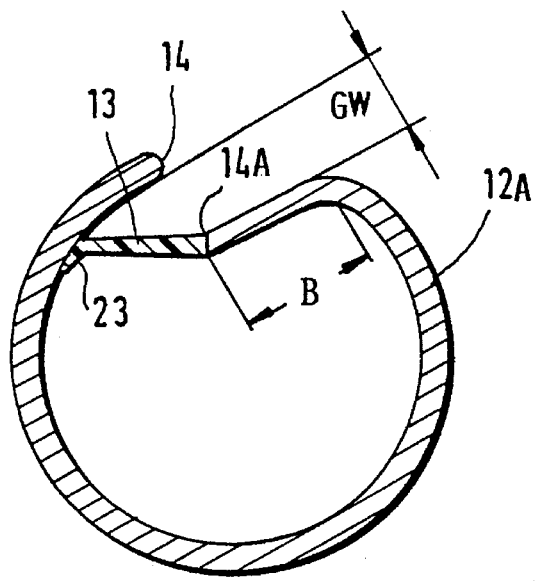
FIG. 10 is a sectional view along section line X—X through the modified air duct.

FIG. 10 shows the hollow air pipe 12A in section with the sealing lip 13 adhesively bonded to an edge 14A of the pipe 12A and with the guide edge 14, whereby the gap GW is formed between the two edges 14 and 14A. The free edge or rim 23 of the sealing lip 13 is flexibly bendable so that the rim 23 can rest with an elastic bias against the inner surface of the pipe 12A. In this embodiment any internal pressure in the pipe 12A also improves the sealing function by pressing the rim 23 of the sealing lip 13 against the inner surface of the pipe 12A. Preferably, the cross-sectional configuration of the pipe 12A is provided with a flat section having a width B along the edge 14A. The flat section B provides a surface area on which a bend portion 16A of the tap member 16 can rest as seen in FIG. 12.

Figure 11:
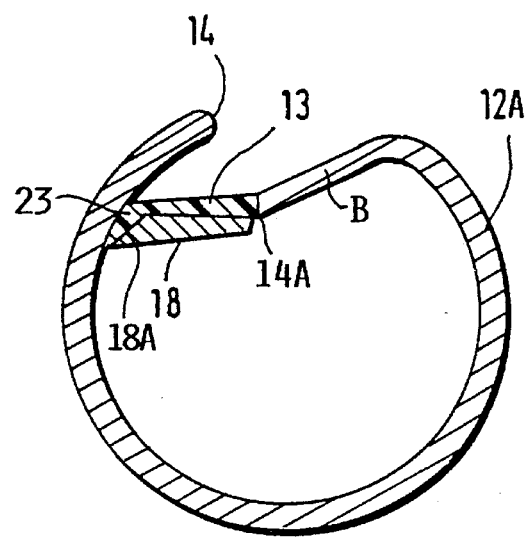
FIG. 11 is a sectional view along section line XI—XI in FIG. 9 also showing the sectional view of the modified air duct to illustrate the relationship between the latter and to the guide slide of FIG. 9.

FIG. 11 is a sectional view along section line XI—XI in FIG. 9, whereby the guide element 18 is shown in a position pressing the sealing lip with its sealing rim 23 against the inner surface of the pipe 12A. The guide element 18 has an edge 18A that conforms to the shape of the rim 23 of the sealing lip 13. FIG. 11 assumes that the slide 15 has been moved into the pipe 12A, whereby the guide surface 18 presses from the inside outwardly against the lip 13.

Figure 12:
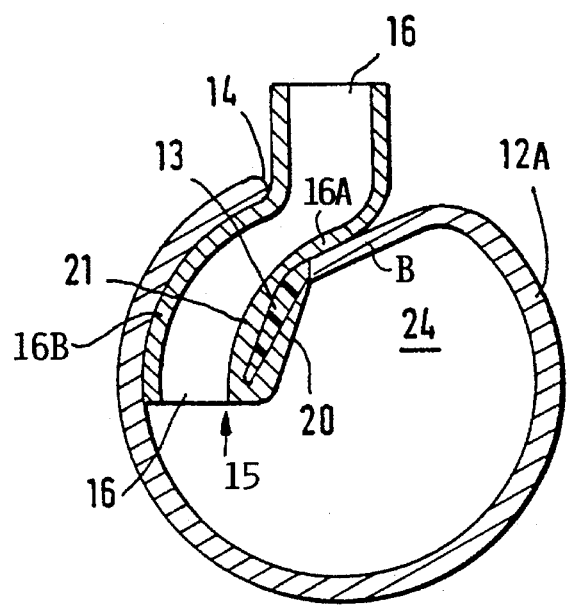
FIG. 12 is a sectional view along section line XII—XII in FIG. 9, illustrating the sealing around the tap member and guide slide similar to FIGS. 5 and 8.
Figure 13:
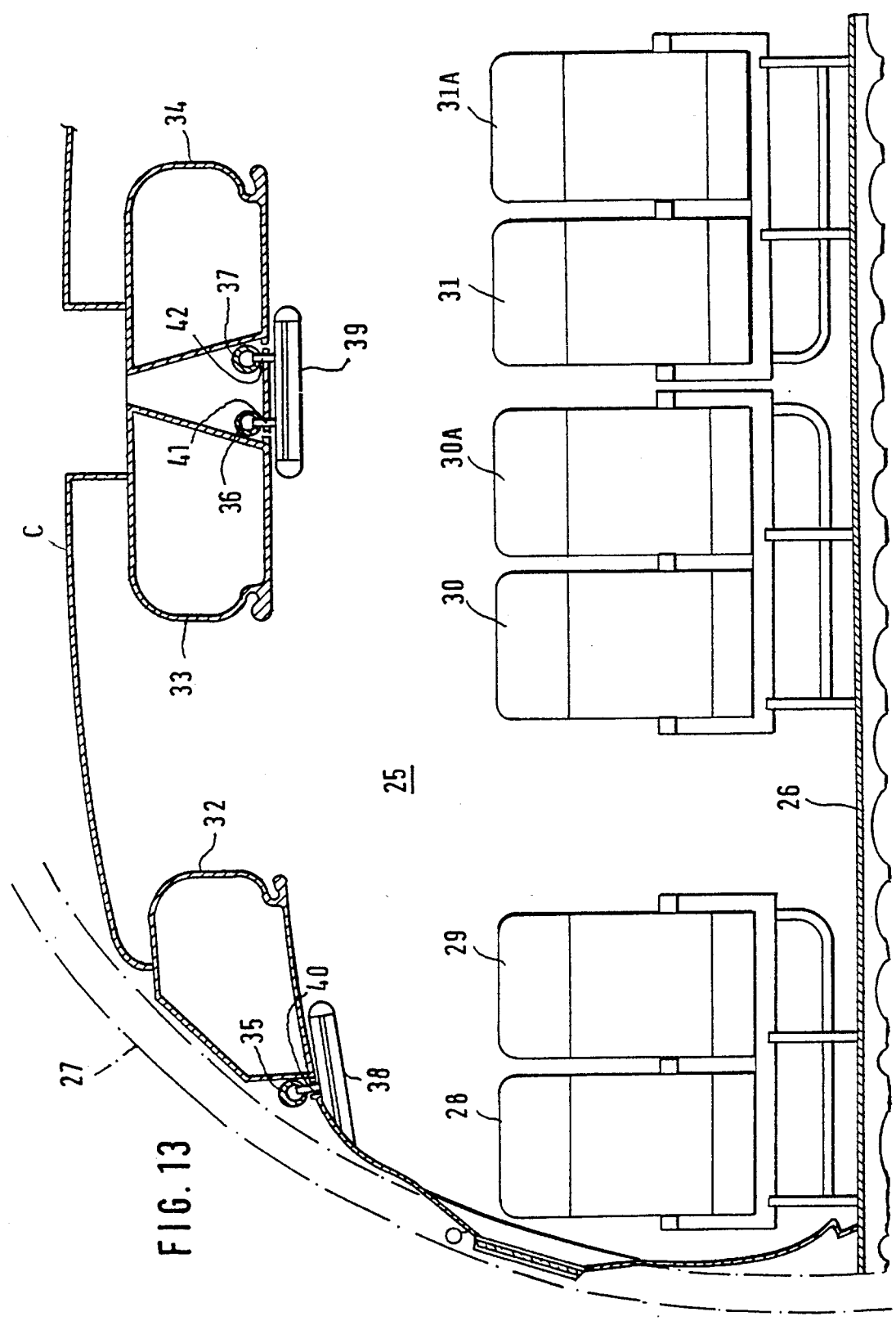
FIG. 13 is an axial view in the longitudinal direction of the aircraft cabin shown partially in section to illustrate the position of the present air ducts relative to passenger service panels.

The sectional view of FIG. 12 illustrates the position of the tap member 16 in the sealed condition, whereby the bend portion 16A passes through the gap GW and rests on the flat section B of the pipe 12A and the outer bend portion 16B of the tap member 16 rests in a sealing manner against the inner surface of the pipe 12A. The passage through the tap member 16 communicates with the interior 24 of the pipe 12A, but the tap is properly sealed all around since the sealing lip 13 fits into the slot 22 between the outer guide surface 21 and the inner guide surface 20. The biasing force of the lip 13 causes the inner guide element or surface 20 to take up the position shown in FIG. 12 where the tap 16 is located. The surfaces are smooth so that the slide 15 can be moved back and forth along the pipe 12A without any difficulties while maintaining a proper seal. FIG. 13 shows a partial sectional view in the direction of the longitudinal aircraft axis with the sectional plane passing perpendicularly to the longitudinal axis through an aircraft cabin 25 having a floor 26 on which seats 28, 29, 30, 30A, 31, and 31A are conventionally positioned. The aircraft body 27 is merely shown in part by dash dotted lines. Luggage compartments 32, 33 and 34 are conventionally arranged below the ceiling C. The luggage compartment 32 forms a wall unit extending alongside the aircraft body wall 27. The luggage compartments 32 and 34 form a central unit arranged above the central seats. An air duct 35 according to the invention is arranged alongside the wall 27 behind the compartment 32 for supplying fresh air to a passenger service panel 38. Similarly, air ducts 36 and 37 according to the invention are arranged between the compartments 33 and 34 for supplying a service panel 39 with fresh air. Panel 38 services two passengers in seats 28 and 29. Panel 39 services four passengers in seats 30, 30A, 31, and 31A.

Each of the service panels 38, 39 is supported, or rather suspended below the respective ceiling section under the respective luggage compartment. A tap member 40 connects the duct 35 to the panel 38. Tap members 41 and 42 connect ducts 36 and 37 respectively to the service panel 39. The panels 38 and 39 are equipped with conventional fresh air outlet nozzles not shown. The panels 38 and 39 also include conventional features, for example, reading lamps, flight attendant calling devices, optical indicators, loudspeakers, oxygen masks, and so forth. The electrical control conductors for these panels are connected to the aircraft wiring through sliding contact devices of known construction.

As described above, the taps 40, 41 and 42 are slideable along the respective ducts 35, 36 and 37 for positioning the taps where they are needed. However, the taps may be rigidly connected to the respective service panel 38 and 39 and then radially inserted into the ducts 35, 36, 37 as described above. Once the tap has been inserted into the pipe or duct at the proper position, the service panel can be fixed in its position. These features of the invention have the advantage that the service panels 38, 39 can be easily shifted in the longitudinal direction of the aircraft when such shift becomes necessary in case the axial spacings between neighboring seats are to be changed, for example, when converting the aircraft cabin from tourist service to business service or vice versa. The panels 38 and 39 are axially adjustable above the seats as will be described in more detail below.

Figure 14:
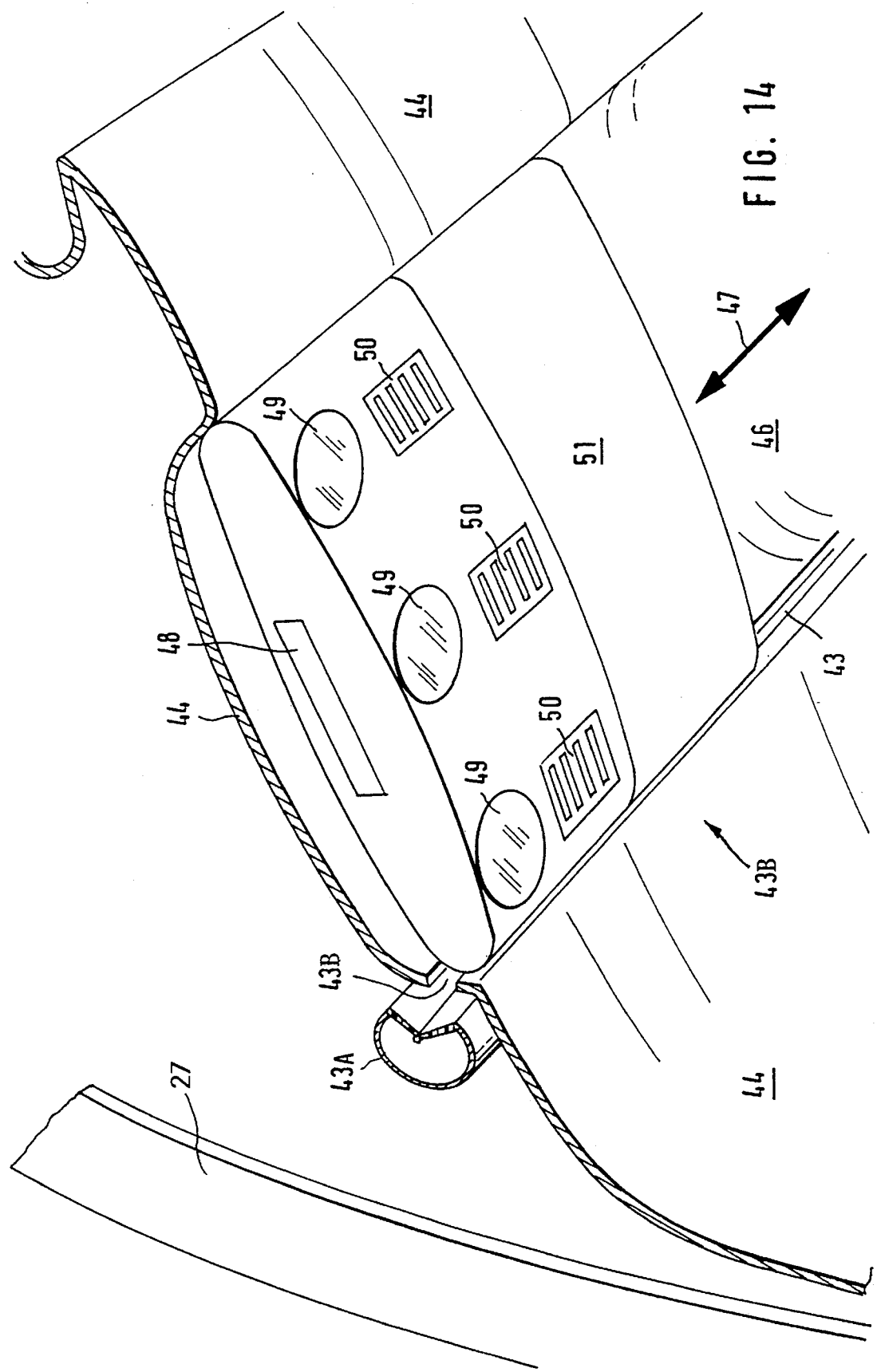
FIG. 14 is a perspective view of a service panel installed in a ceiling channel of the aircraft cabin.

FIG. 14 shows a perspective view partially in section, of a service panel 43 secured to a cabin wall 44 such as a ceiling section provided with a channel 46 in which the service panel 43 is slideable back and forth as indicated by the arrow 47. For this purpose the channel 46 is provided with guide rails or guide grooves in which respective cooperating elements of the service panel 43 are received for the back and forth positioning of the service panel 43. The panel 43 includes a display section 48 primarily visible from a position facing in the longitudinal direction of the aircraft. Additionally, the panel 43 is equipped with three downwardly directed reading lights 49 and three fresh air outlets 50. A flap door 51 covers a compartment for three oxygen masks not shown, but of conventional construction. In order to supply fresh air to the outlets 50, the panel 43 is connected to the air duct 43A through tap members not shown, but extending through a slot 43B in the ceiling section 44. These tap members can be of the type as described above with reference to FIGS. 1 to 8 or 9 to 12. The electrical supply and control of the panel 43 is accomplished conventionally through slide contact electrical conductor rails not shown.

Figure 15:
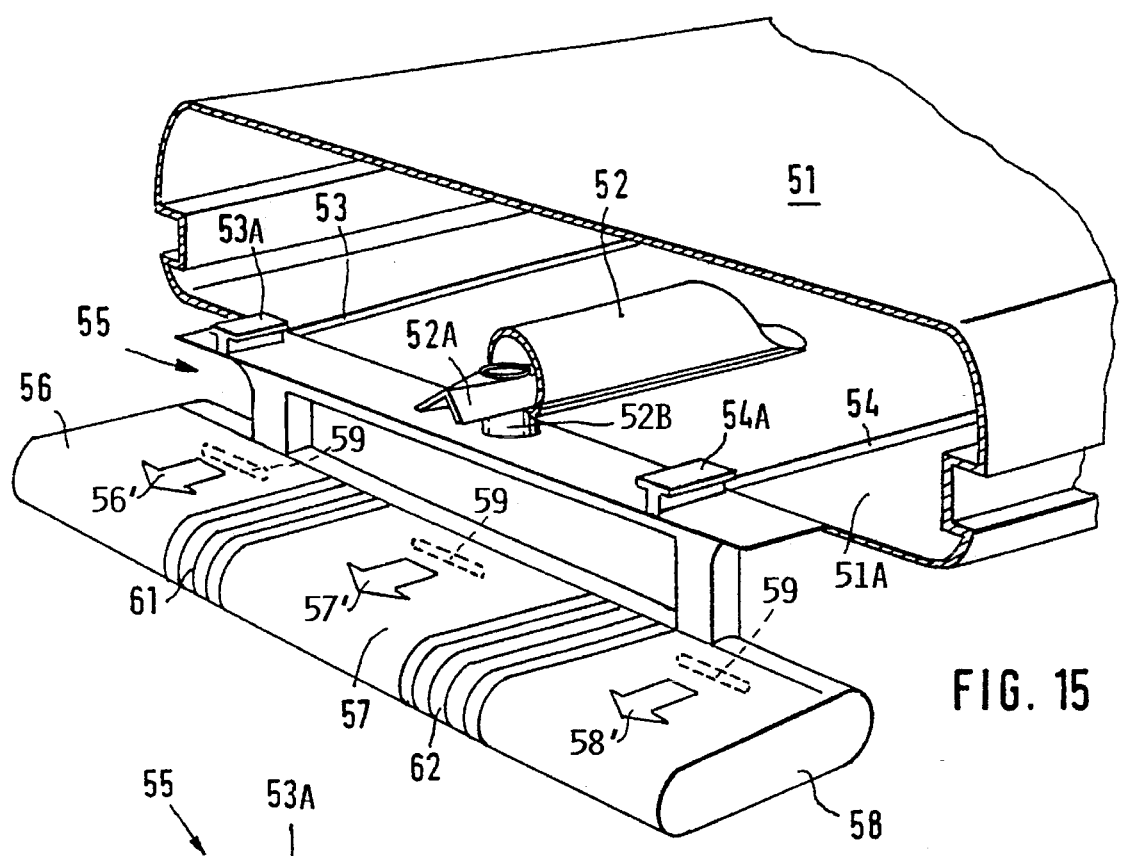
FIG. 15 shows a perspective view of another service panel secured to the cabin ceiling by a cross bridge.
Figure 16:
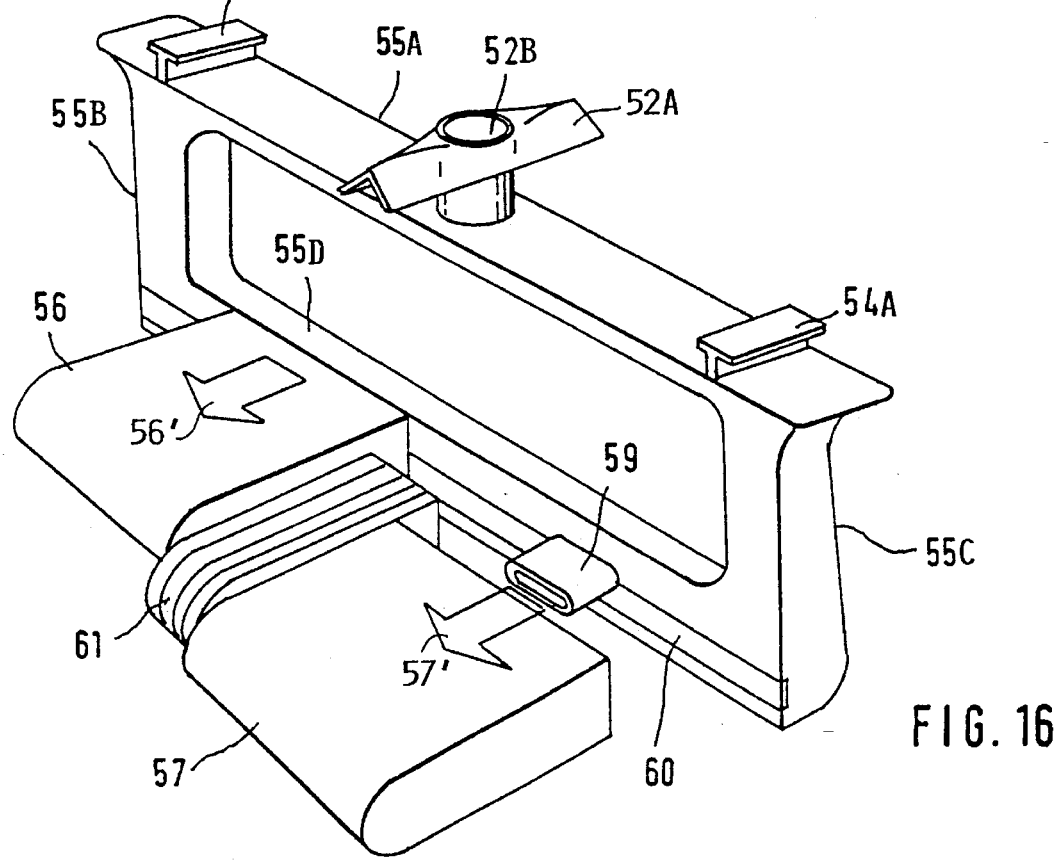
FIG. 16 is a perspective view showing further details of the cross bridge of FIG. 15.

Referring to FIGS. 15 and 16 in conjunction, service panels 56, 57, and 58 are secured to a luggage compartment 51 by a cross-bridge 55 seen in more detail in FIG. 16. The luggage compartment 51 is equipped with an air duct 52 according to the invention, and with guide channels or grooves 53 and 54 in the bottom wall 51A of the compartment 51. The cross-bridge 55 has guide rail sections 53A and 54A that engage the guide channels 53 and 54 respectively, whereby the position of the cross-bridge 55 can be adjusted along the longitudinal axis of the aircraft cabin. This adjustment is possible because the slide 52A with its tap member 52B is slidingly received in a sealed manner in the air duct 52 as described above. The tap member 52B is rigidly secured to the cross-bridge 55 which carries the three service panels 56, 57 and 58 with spacer bellows elements 61, 62 arranged between neighboring service panels.

As shown in FIG. 16, the tap member 52B extends into a horizontal tubular section 55A of the cross-bridge 55. Further vertical tubular members 55B and 55C and an additional horizontal tubular member 55D complete the cross-bridge 55, whereby the service panels 56, 57 are preferably adjustably secured to the lower cross-member 55D. For this purpose, a slot with a sealing lip 60 is provided in the hollow cross-member 55D and tap members 59 adjustable along the sealing lip 60 reach into the respective service panels 56, 57, 58. Thus, these panels can be adjusted in unison in the axial direction of the aircraft by moving the cross-bridge 55 along the guide channels 53, 54, and in the cross-wise direction by adjusting the taps 59 along the sealing lips 60. The units 56, 57, 58 can be taken out by withdrawing these units as indicated by the arrows 56', 57', and 58'. These arrows also indicate the air flow out of the taps 59 and into the air outlets 50 seen in FIG. 14.

The air duct 52 is constructed as described above and forms a slotted rigid shape retaining hollow duct or pipe for supplying the fresh air into the service panels. The taps 59 may be rigidly connected to the respective service panel. Since the service panels 56, 57 and 58 are connected to the common cross-bridge 55, they are adjustable in the axial cabin direction in unison. However, crosswise adjustment is individually possible due to the bellows type spacer elements 61, 62. This feature of the invention makes sure that depending on the number of service panels connected to the cross-bridge, a uniform optical appearance is assured even if two or three or four service panels are connected to one cross-bridge.

Rather than connecting the panels 56, 57 and 58 in an adjustable manner to the lower cross-member 55D of the cross-bridge 55, it is also possible to connect these service panels rigidly to the lower cross-bar of the bridge 55. In that case, the bellows type spacer element 61, 62 may not be necessary.

The service panels described herein are shown in an aircraft cabin. However, such service panels may be installed in any enclosed space where the supply of fresh air to individual persons is important, for example in a train, especially high speed trains, in tight working quarters, in ship cabins, and similar environments which require a controllable fresh air supply.

Figure 17:
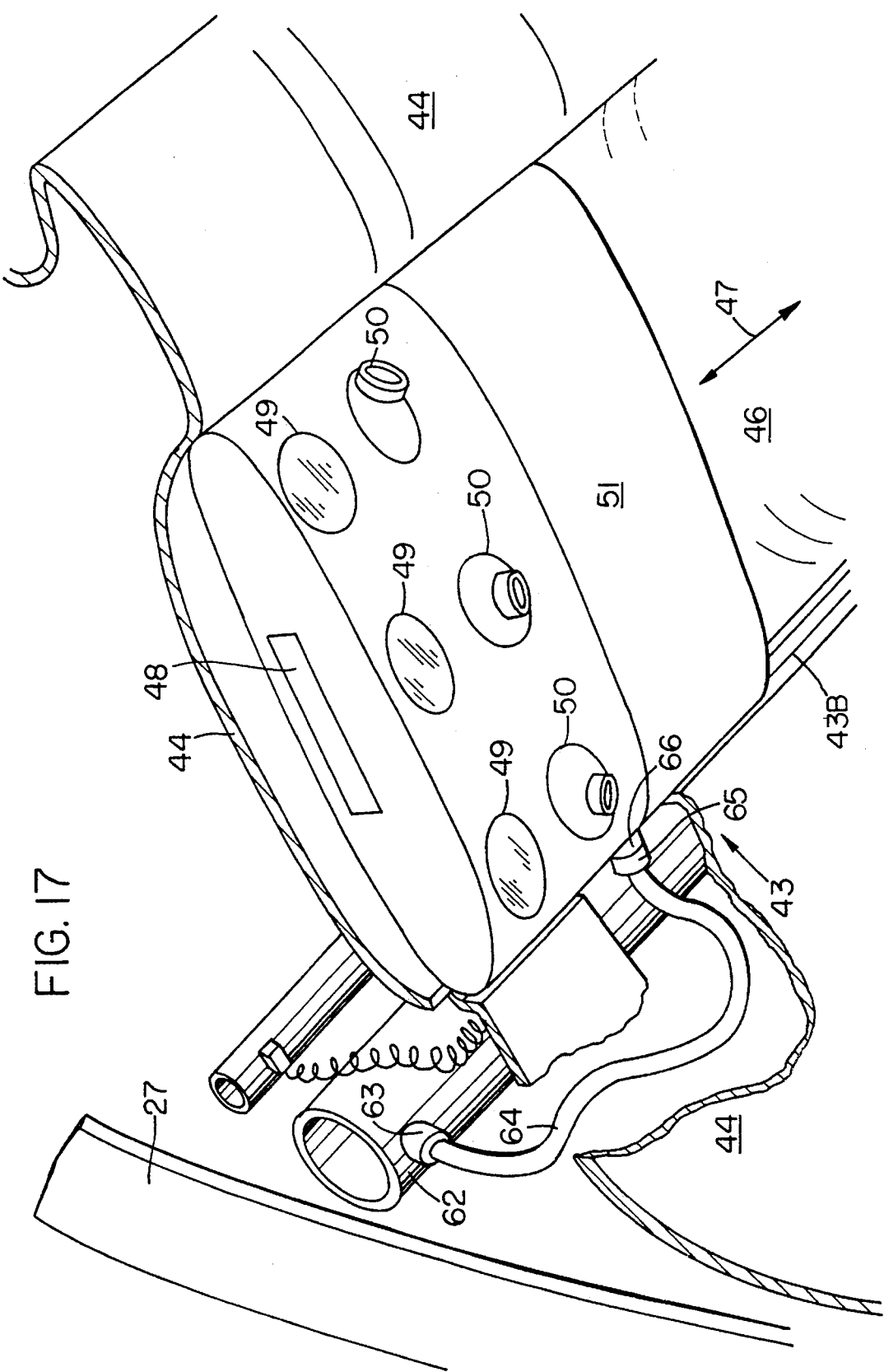
FIG. 17 is a view similar to that of FIG. 14, but showing a second embodiment with a flexible tap extension.

FIG. 17 shows a second embodiment of the invention, wherein components that are the same in FIGS. 14 and 17 have the same reference numbers. In FIG. 17 a rigid air duct 62 with a fixed tap member 63 is connected to the axially adjustable panel 51 by a flexible tap extension hose 64 that may be an integral or separate part of the fixed tap member 63. The flexible hose 64 is connected by to a nipple 65, for example, with a hose clamp 66 to the air outlets 50 in the panel 51 whereby the panel 51 is position adjustable along the guide slots 43B as indicated by the double arrow 47 because the hose 64 is flexible.

A further guide slot, not visible in FIG. 17, is positioned in the ceiling 44 opposite the guide slot 43B. The nipple 65 extends through the slot 43. Sections of the slot 43B between neighboring panels 51 may be covered by suitable moldings not shown.

In a preferred embodiment the air tap 63 is also adjustable along the length of the duct 62 as described above with reference to FIGS. 1 to 16. In such an embodiment the range of adjustment of the panel 51 is even increased because the flexibility of the hose 65 and the adjustable tap both contribute to increasing the adjustment range. In such an embodiment it may be sufficient to provide gaps GW of limited length and spaced from each other along the length of the air duct.

Although the invention has been described with reference to specific example embodiments in an aircraft cabin, the present position adjustable air outlets can be used wherever air outlets are required, for example in testing stands. Thus, it will be appreciated that it is intended to cover all modifications and equivalents within the scope of the appended claims.

What I claim is:

1. An air supply apparatus, comprising a service panel, an air outlet in said service panel, a hollow air duct, at least one air tap member connected to said hollow air duct for withdrawing air from said hollow air duct, and a position adjustment device for feeding air from said hollow air duct through said air tap member to said air outlet of said service panel, so that said service panel is position adjustable, and wherein said position adjustment device comprises a longitudinal gap in said hollow air duct having at least one elastic sealing lip biased to normally close said longitudinal gap, a sealing guide slide (2, 15) slidingly fitting into said longitudinal gap, said air tap member (10, 16) being carried on said sealing guide slide, said air tap member passing through said sealing guide slide for permitting an air flow out of said hollow air duct through said air tap member into said air outlet of said service panel, said sealing guide slide having at least two guide elements (8, 9) forming at least one sealing slot in which said at least one sealing lip of said hollow air duct is slidingly received in a sealed manner, so that said sealing guide slide is adjustable in its position along said longitudinal gap in said hollow air duct while said sealing lip and said at least two guide elements maintain a continuous seal around said air tap member and between said sealing lip and said hollow air duct.

2. The air supply apparatus of claim 1, comprising two parallel sealing lips (4, 5) extending into said air duct to form a sealed surface (S) where inner edges (6, 7) of said sealing lips contact each other with an elastic bias toward each other, and wherein each of said guide elements (8, 9) has two wings (8A, 8B; 9A, 9B) arranged so that the respective guide element substantially forms an angular section, said tap member extending through both angular sections, wherein one pair of wings (9A, 9B) forms an inner guide element inside said hollow air duct, and wherein the other pair of wings (8A, 8B) forms an outer guide element outside said hollow air duct.

3. The air supply apparatus of claim 2, wherein each of said wings of said guide elements comprises a guide rim (8C, 9C) along its longitudinal edge, said guide rim contacting a wall surface of said hollow air duct.

4. The air supply apparatus of claim 2, wherein said wings are spaced from each other to form two sealing slots, one of said two sealing lips being received in each of said sealing slots in a guiding manner, whereby said slide has one guide slot for each sealing lip (4, 5).

5. The air supply apparatus of claim 2, wherein said two sealing lips (4, 5) together form a V-configuration reaching into said hollow air duct where a seal is formed.

6. The air supply apparatus of claim 1, wherein said hollow air duct has a guide edge (14) along one side of said gap, said at least one sealing lip (13) reaching across said gap in said hollow air duct (12A) so that a sealing edge (23) of said sealing lip (13) contacts an inner surface of said hollow air duct near said guide edge (14) outside said tap member (16), said sealing slide (15) with its guide elements (18, 19) fitting into said gap so that said tap member (16) is guided on one side by said guide edge (14) and on its opposite side by said sealing lip (13).

7. The air supply apparatus of claim 6, wherein one of said guide elements has an inner guide section (20) and two guide surfaces (18, 19) interconnected by said inner guide section (20), and wherein the other one of said guide elements forms an outer guide section (21) that forms part of a wall of said tap member (16), said inner guide section (20) and said outer guide section (21) being spaced from each other to form said sealing slot (22) having a sectional configuration corresponding to a respective sectional configuration of said sealing lip (13) which is slidingly received in said sealing slot (22) in a sealing manner.

8. The air supply apparatus of claim 1, wherein cooperating surfaces of said sealing lip or lips and of said sealing slide are smooth to facilitate a sliding movement of said surfaces relative to each other and to provide proper seals.

9. The air supply apparatus of claim 1, wherein said tap member (10, 16) is rigidly connected to said service panel, said sealing guide slide with said tap member being linearly guided in said gap of said hollow air duct which is installed in an aircraft cabin so that said service panel is adjustable in its position back and forth and linearly relative to an inner wall of said aircraft cabin.

10. The air supply apparatus of claim 9, comprising guides for linearly displacing said service panel in the direction of a longitudinal aircraft axis.

11. The air supply apparatus of claim 9, comprising guides for linearly displacing said service panel in a direction at an angle to a longitudinal aircraft axis.

12. The air supply apparatus of claim 9, wherein said aircraft cabin has a guide channel, said service panel being slideably mounted in said guide channel.

13. The air supply apparatus of claim 9, comprising a plurality of service panels forming a group of panels, and bellows filler elements between neighboring service panels of said group.

14. The air supply apparatus of claim 9, further comprising a cross-bridge (55) securing said service panel to said aircraft cabin.

15. The air supply apparatus of claim 14, wherein said service panel is constructed as a unit suspended from a cabin ceiling by said cross-bridge.

16. The air supply apparatus of claim 12, wherein said guide channel is constructed as part of a cabin wall, said guide channel extending longitudinally of said aircraft cabin, said service panel being constructed as a unit adjustable in its position along said guide channel.

17. The air supply apparatus of claim 2, wherein said inner guide element (9) has a central groove (11) in which inner edges (6, 7) of said sealing lips (4, 5) are slidingly received.

18. The air supply apparatus of claim 1, wherein said position adjustment device further comprising a flexible air hose of sufficient length connecting said air tap member to said air outlet of said service panel.

19. The air supply apparatus of claim 1, wherein said position adjustment device further comprises a flexible air hose connected to said position adjustable tap member and to said air outlet of said service panel.

* * * * *